(12) United States Patent
Woo et al.

(10) Patent No.: US 10,549,625 B2
(45) Date of Patent: Feb. 4, 2020

(54) METHOD FOR CONTROLLING ACTIVE AIR FLAP BASED ON AERODYNAMIC FORCE GAIN AND ECO VEHICLE THEREOF

(71) Applicants: Hyundai Motor Company, Seoul (KR); Kia Motors Corporation, Seoul (KR)

(72) Inventors: Jeong-Yeop Woo, Incheon (KR); Kyu-Beom Ko, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 173 days.

(21) Appl. No.: 15/618,712

(22) Filed: Jun. 9, 2017

(65) Prior Publication Data
US 2018/0079295 A1 Mar. 22, 2018

(30) Foreign Application Priority Data
Sep. 19, 2016 (KR) .................. 10-2016-0119411

(51) Int. Cl.
*B60K 11/08* (2006.01)
*B62D 35/00* (2006.01)
*B60H 1/00* (2006.01)

(52) U.S. Cl.
CPC .......... *B60K 11/085* (2013.01); *B62D 35/005* (2013.01); *B60H 1/00* (2013.01); *Y02T 10/88* (2013.01)

(58) Field of Classification Search
CPC ....... B60K 11/085; B60K 11/08; B60K 11/06; B62D 35/005; B60H 1/00; F01P 1/00
See application file for complete search history.

(56) References Cited

U.S. PATENT DOCUMENTS

| 4,779,577 | A | 10/1988 | Ritter et al. |
| 9,518,502 | B2* | 12/2016 | Nam ................... B60K 11/085 |
| 2013/0223980 | A1* | 8/2013 | Pastrick .............. B60K 11/085 |
| | | | 415/1 |
| 2014/0038507 | A1 | 2/2014 | Abeska et al. |
| 2018/0022210 | A1* | 1/2018 | Matsumura ........... B60K 11/04 |
| | | | 123/41.05 |

FOREIGN PATENT DOCUMENTS

| JP | 2011031842 A | 2/2011 |
| JP | 2014-159250 A | 9/2014 |
| JP | 2014-201278 A | 10/2014 |
| KR | 10-2013-0062148 A | 6/2013 |
| KR | 10-1520328 B1 | 5/2015 |
| KR | 10-2015-0071224 A | 6/2015 |

* cited by examiner

*Primary Examiner* — Todd M Melton
(74) *Attorney, Agent, or Firm* — Morgan, Lewis & Bockius LLP

(57) ABSTRACT

A method for controlling an active air flap (AAF) based on an aerodynamic force gain may include an AAF optimization cooling-related mode in which the AAF is configured to be controlled to operate in an AAF open state or an AAF close state to match a detected ambient temperature and a detected vehicle speed when an operation of a heating device is detected by a controller during vehicle traveling.

15 Claims, 9 Drawing Sheets

AERODYNAMIC FORCE GAIN PORTION AT 0°C

| AAF CONTROL \ VEHICLE SPEED [kph] | 10 | 20 | 30 | 40 |
|---|---|---|---|---|
| Close – ① | a1 | a2 | a3 | a4 |
| Open – ② | A1 | A2 | A3 | A4 |
| AERODYNAMIC FORCE GAIN PORTION = ② – ① | k1(0) | +k2 | +k3 | +k4 |

AERODYNAMIC FORCE GAIN PORTION AT −5°C

| AAF CONTROL \ VEHICLE SPEED [kph] | 10 | 20 | 30 | 40 |
|---|---|---|---|---|
| Close – ① | b1 | b2 | b3 | b4 |
| Open – ② | B1 | B2 | B3 | B4 |
| AERODYNAMIC FORCE GAIN PORTION = ② – ① | m1(0) | +m2 | +m3 | +m4 |

AERODYNAMIC FORCE GAIN PORTION AT −10°C

| AAF CONTROL \ VEHICLE SPEED [kph] | 10 | 20 | 30 | 40 |
|---|---|---|---|---|
| Close – ① | d1 | d2 | d3 | d4 |
| Open – ② | D1 | D2 | D3 | D4 |
| AERODYNAMIC FORCE GAIN PORTION = ② – ① | n1(0) | +n2 | +n3 | +n4 |

FIG.3B

| 40 | 50 | 60 | 70 | 80 | 90 | 100 | 110 | 120 | 130 | 140 |
|---|---|---|---|---|---|---|---|---|---|---|
| a4 | a5 | a6 | a7 | a8 | a9 | a10 | a11 | a12 | a13 | a14 |
| A4 | A5 | A6 | A7 | A8 | A9 | A10 | A11 | A12 | A13 | A14 |
| +k4 | +k5 | +k6 | +k7 | +k8 | +k9 | +k10 | +k11 | +k12 | +k13 | +k14 |

| 40 | 50 | 60 | 70 | 80 | 90 | 100 | 110 | 120 | 130 | 140 |
|---|---|---|---|---|---|---|---|---|---|---|
| b4 | b5 | b6 | b7 | b8 | b9 | b10 | b11 | b12 | b13 | b14 |
| B4 | B5 | B6 | B7 | B8 | B9 | B10 | B11 | B12 | B13 | B14 |
| +m4 | +m5 | +m6 | +m7 | +m8 | +m9 | +m10 | +m11 | +m12 | +m13 | +m14 |

| 40 | 50 | 60 | 70 | 80 | 90 | 100 | 110 | 120 | 130 | 140 |
|---|---|---|---|---|---|---|---|---|---|---|
| d4 | d5 | d6 | d7 | d8 | d9 | d10 | d11 | d12 | d13 | d14 |
| D4 | D5 | D6 | D7 | D8 | D9 | D10 | D11 | D12 | D13 | D14 |
| +n4 | +n5 | +n6 | +n7 | +n8 | +n9 | +n10 | +n11 | +n12 | +n13 | +n14 |

| AMBIENT TEMPERATURE(°C) | VEHICLE SPEED[kph] | AAF OPERATION | HEATING POWER CONSUMPTION (① + ②) [W] |
|---|---|---|---|
| 0°C | 40 | Close | $W_0 = e1$ |
| | | Open | $W_0 = e2$ |
| | 60 | Close | $W_0 = e3$ |
| | | Open | $W_0 = e4$ |
| | 80 | Close | $W_0 = e5$ |
| | | Open | $W_0 = e6$ |
| | 100 | Close | $W_0 = e7$ |
| | | Open | $W_0 = e8$ |
| -5°C | 40 | Close | $W_{-5} = e9+f9$ |
| | | Open | $W_{-5} = e10+f10$ |
| | 60 | Close | $W_{-5} = e11+f11$ |
| | | Open | $W_{-5} = e12+f12$ |
| | 80 | Close | $W_{-5} = e13+f13$ |
| | | Open | $W_{-5} = e14+f14$ |
| | 100 | Close | $W_{-5} = e15+f15$ |
| | | Open | $W_{-5} = e16+f16$ |
| -10°C | 40 | Close | $W_{-10} = e17+f17$ |
| | | Open | $W_{-10} = e18+f18$ |
| | 60 | Close | $W_{-10} = e19+f19$ |
| | | Open | $W_{-10} = e20+f20$ |
| | 80 | Close | $W_{-10} = e21+f21$ |
| | | Open | $W_{-10} = e22+f22$ |
| | 100 | Close | $W_{-10} = e23+f23$ |
| | | Open | $W_{-10} = e24+f24$ |

| AMBIENT TEMPERATURE(°C) | VEHICLE SPEED[kph] | AAF OPERATION | HEATING POWER CONSUMPTION[W] | AAF AERODYNAMIC FORCE GAIN PORTION[Wgain] |
|---|---|---|---|---|
| 0°C | 40 | Close | $W_0$ | Wgain_k |
| | 40 | Open | $W_0$ | 0 |
| | 60 | Close | $W_0$ | Wgain_k |
| | 60 | Open | $W_0$ | 0 |
| | 80 | Close | $W_0$ | Wgain_k |
| | 80 | Open | $W_0$ | 0 |
| | 100 | Close | $W_0$ | Wgain_k |
| | 100 | Open | $W_0$ | 0 |
| −5°C | 40 | Close | $W_{-5}$ | Wgain_m |
| | 40 | Open | $W_{-5}$ | 0 |
| | 60 | Close | $W_{-5}$ | Wgain_m |
| | 60 | Open | $W_{-5}$ | 0 |
| | 80 | Close | $W_{-5}$ | Wgain_m |
| | 80 | Open | $W_{-5}$ | 0 |
| | 100 | Close | $W_{-5}$ | Wgain_m |
| | 100 | Open | $W_{-5}$ | 0 |
| −10°C | 40 | Close | $W_{-10}$ | Wgain_n |
| | 40 | Open | $W_{-10}$ | 0 |
| | 60 | Close | $W_{-10}$ | Wgain_n |
| | 60 | Open | $W_{-10}$ | 0 |
| | 80 | Close | $W_{-10}$ | Wgain_n |
| | 80 | Open | $W_{-10}$ | 0 |
| | 100 | Close | $W_{-10}$ | Wgain_n |
| | 100 | Open | $W_{-10}$ | 0 |

FIG.5B

| TOTAL POWER CONSUMPTION [Wtotal] | POWER CONSUMPTION INCREASING/ DECREASING PORTION DURING AAF CLOSE [W] | AAF OPERATION |
|---|---|---|
| $W_0 - Wgain\_k$ / $W_0$ | $+X$ | Close |
| $W_0 - Wgain\_k$ / $W_0$ | $+X$ | Close |
| $W_0 - Wgain\_k$ / $W_0$ | $+X$ | Close |
| $W_0 - Wgain\_k$ / $W_0$ | $+X$ | Close |
| $W_{-5} - Wgain\_m$ / $W_{-5}$ | $-X$ | Open |
| $W_{-5} - Wgain\_m$ / $W_{-5}$ | $-X$ | Open |
| $W_{-5} - Wgain\_m$ / $W_{-5}$ | $+X$ | Close |
| $W_{-5} - Wgain\_m$ / $W_{-5}$ | $+X$ | Open |
| $W_{-10} - Wgain\_n$ / $W_{-10}$ | $-X$ | Open |
| $W_{-10} - Wgain\_n$ / $W_{-10}$ | $-X$ | Open |
| $W_{-10} - Wgain\_n$ / $W_{-10}$ | $-X$ | Open |
| $W_{-10} - Wgain\_n$ / $W_{-10}$ | $+X$ | Close |

20-1

METHOD FOR CONTROLLING ACTIVE AIR FLAP BASED ON AERODYNAMIC FORCE GAIN AND ECO VEHICLE THEREOF

CROSS-REFERENCE(S) TO RELATED APPLICATIONS

The present application claims priority to Korean Patent Application No. 10-2016-0119411, filed on Sep. 19, 2016, the entire contents of which is incorporated herein for all purposes by this reference.

BACKGROUND OF THE INVENTION

Field of the Invention

Exemplary embodiments of the present invention relate to active air flap control, and particularly, to a method for controlling an active air flap and an eco vehicle thereof, which can perform an open/close control of the active air flap based on an aerodynamic force gain portion at a low subzero ambient temperature.

Description of Related Art

In general, even an echo vehicle brings a fuel ratio improvement effect through improvement of an aerodynamic force performance, and thus an active air flap (AAF) is applied thereto.

Since the AAF is controlled to be opened or closed to match the vehicle speed so as to adjust introduction of traveling wind into an engine room, the aerodynamic force performance is improved to lead to the fuel ration improvement effect. In particular, the AAF is divided into an aerodynamic force improvement mode, a cooling-related mode, and a heating-related mode through adjustment of a flap open step between open (completely open (100%)) and close (completely close (0%)) states to maximize the utility thereof.

As an example, the aerodynamic force improvement mode corresponds to a basic function that improves the aerodynamic force performance by adjusting the traveling wind that is introduced into the engine room through adjustment of the flap open step of the AAF to match the vehicle speed. The cooling-related mode corresponds to a function that heightens the heat-exchange performance by introducing the traveling wind to a cooling fan, a condenser, and a radiator through opening of the AAF that matches a cooling load of an air conditioner when an air conditioner system is operated. The heating-related mode corresponds to a function that heightens the heat-exchange performance by introducing the traveling wind to a heat pump through opening of the AAF that matches a heating load of the heat pump when a heat pump heating system is operated.

Accordingly, the AAF brings the aerodynamic force and cooling/heating performance improvement to contribute to even the fuel ratio improvement.

However, the heating-related mode of the AAF has low contribution to optimization of heating power consumption since only component cooling conditions according to the operation of the heat pump heating system are considered in the heating-related mode.

As an example, in the heating-related mode of the AAF, the AAF is kept closed when the heat pump heating system is operated at an ambient temperature below the freezing point (atmospheric condition on which the temperature is about five degrees below the freezing point or lower) at which heat generation of the components is not high, and the AAF is switched over to an open state on the component cooling conditions.

As a result, the opportunity that the heating efficiency of the heat pump heating system is heightened through heat exchange with the subzero ambient temperature is snatched away, and thus the fuel ratio improvement effect according to the reduction of the heating power consumption cannot be expected.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling an active air flap (AAF) based on an aerodynamic force gain and an eco vehicle thereof, which can achieve a reduction of heating power consumption and fuel ratio improvement by increasing the heating efficiency according to heat exchange with an ambient temperature below the freezing point during heat pump heating at the ambient temperature below the freezing point through the control of the active air flap based on an aerodynamic force gain portion according to an open/close state of the AAF instead of component cooling conditions, and particularly, which can implement an optimum control of the AAF through division of the AAF into a heating-related mode, in which the ambient temperature below the freezing point is applied as AAF open/close conditions, in addition to the existing aerodynamic force improvement mode and cooling-related mode.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method for controlling an active air flap (AAF) based on an aerodynamic force gain includes detecting an ambient temperature and a vehicle speed by a controller related to an AAF low-temperature operation map during traveling of a vehicle; detecting an operation state of the AAF before detecting an operation of a heating device; determining whether the ambient temperature coincides with an ambient-temperature operation control condition of the AAF when detecting the operation of the heating device; determining whether the vehicle speed coincides with the vehicle-speed operation control condition of the AAF when the ambient temperature coincides with the ambient-temperature operation control condition; controlling the AAF to operate in an AAF open state through matching of the ambient temperature to the vehicle speed when the vehicle speed coincides with the vehicle-speed operation control condition; controlling an ambient-temperature operation of the AAF to be switched over from the AAF open state to an AAF close state according to the ambient temperature; and controlling a speed operation switchover of the AAF to be switched over from the AAF close state to the AAF open state through matching of the ambient temperature to a redetected vehicle speed when the vehicle speed coincides with the vehicle-speed operation control condition due to a reduction of the redetected vehicle speed after the operation of the AAF is switched over to the AAF close state when the vehicle speed does not coincide with the vehicle-speed operation control condition.

An operation state of the AAF may correspond to an aerodynamic force improvement mode in which the AAF is controlled to operate in the AAF open state or the AAF close state to improve the aerodynamic force of the vehicle, or a cooling-related mode in which the AAF is controlled to operate in the AAF open state or the AAF close state according to an operation of a cooling device.

The AAF may be controlled to operate in the AAF close state when the ambient temperature does not coincide with the ambient-temperature operation control condition.

Determination of the ambient temperature may be performed by determining the ambient temperature as a detected ambient temperature and determining whether the detected ambient temperature is lower than a lower-limit ambient temperature setting value. Determination of the vehicle speed may be performed by determining the vehicle speed as a detected vehicle speed and determining whether the detected vehicle speed is lower than an upper-limit vehicle speed setting value. A speed operation switchover may be performed by determining whether the redetected vehicle speed is lower than the lower-limit vehicle speed setting value.

The ambient-temperature operation switchover may be performed so that the AAF is switched over from the AAF open state to the AAF close state in the case where the redetected ambient temperature is higher than an upper-limit ambient temperature setting value and the ambient-temperature operation control condition is not continuously kept at the redetected ambient temperature.

In accordance with another exemplary embodiment of the present invention, an eco vehicle includes a controller configured to control an open or close operation of an active air flap (AAF) in an AFF optimization cooling-related mode in which a heat exchanging effect between a heat pump of a heating device and the atmosphere is heightened through matching of a detected ambient temperature to a vehicle speed in addition to an aerodynamic force improvement mode that is performed to match the vehicle speed to improve an aerodynamic force and a cooling-related mode that is performed to match a cooling load of a cooling device; and a heating ventilating and air conditioning system including the cooling device and the heating device together with the AAF.

The controller may be related to an AAF low-temperature operation map, and the AAF low-temperature operation map may be divided into open and close states of the AAF through matching of an aerodynamic force gain table according to the open/close state of the AAF at a temperature below the freezing point to a heating power consumption table according to the open/close state of the AAF when the cooling device and the heating device are operated at the temperature below the freezing point.

The echo vehicle to which the active air flap control according to an exemplary embodiment of the present invention is applied has the following advantages and effects.

First, since the AAF is controlled by the aerodynamic force gain portion according to the open/close state of the AAF, the aerodynamic force performance improvement contribution of the AAF is greatly heightened. Second, since the open/close state of the AAF is implemented through matching of the aerodynamic force gain portion to the ambient temperature below the freezing point, the optimum control of the AAF can be implemented against the component cooling condition. Third, through the optimum control of the AAF through matching of the aerodynamic force gain portion to the ambient temperature below the freezing point, the heat exchanging effect and the heating power consumption of the heat pump heating system that is operated in subzero weather can be reduced. Fourth, through the reduction of the heating power consumption during the operation of the heat pump heating system, the fuel ratio improvement of the echo vehicle can be achieved. Fifth, through reduction of the heating power consumption during the operation of the heating system, the real-road fuel ratio of an electric vehicle that has the heat pump as a main heating system can be greatly improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
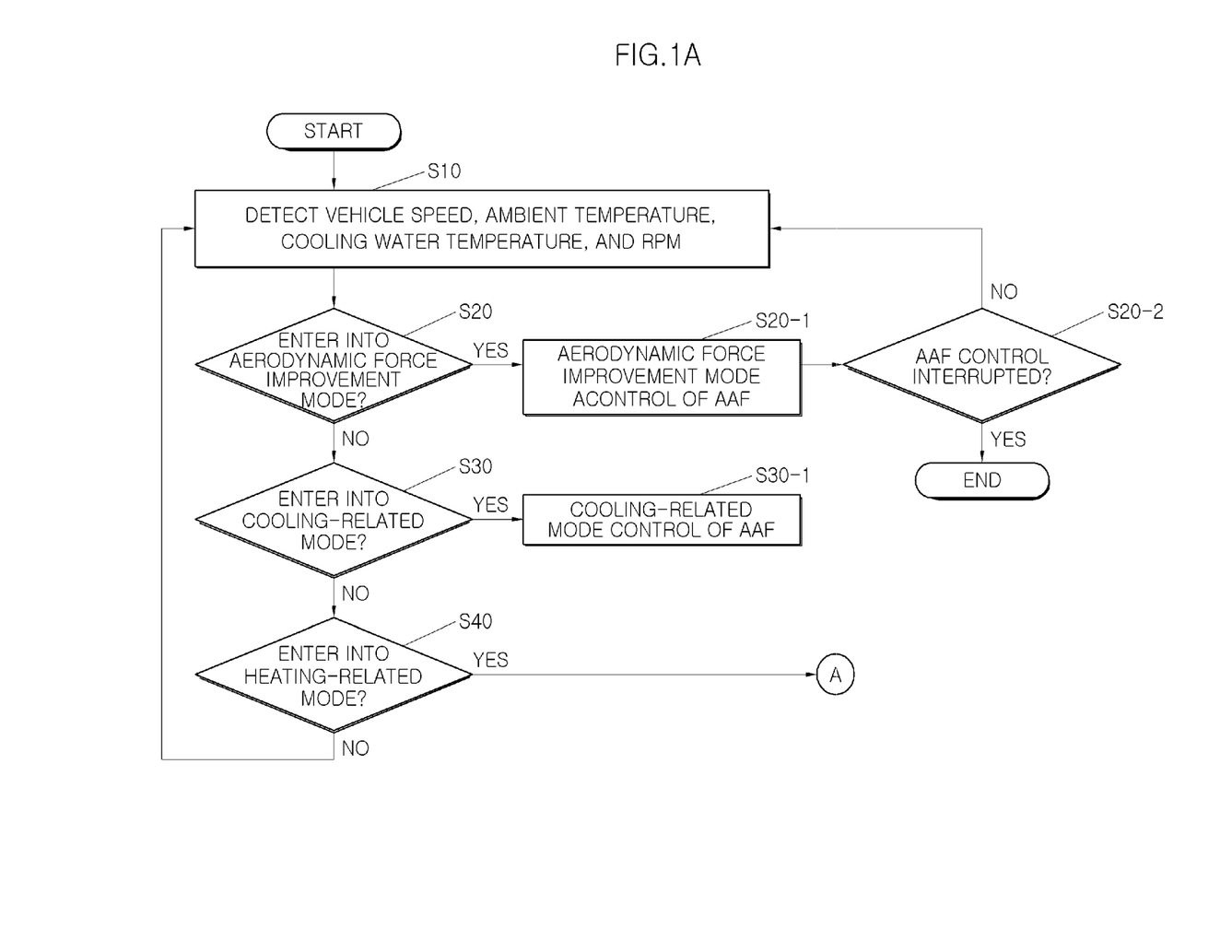
FIG. 1A and FIG. 1B are a flowchart illustrating a method for controlling an active air flap based on an aerodynamic force gain according to an exemplary embodiment of the present invention.
Figure 1B:
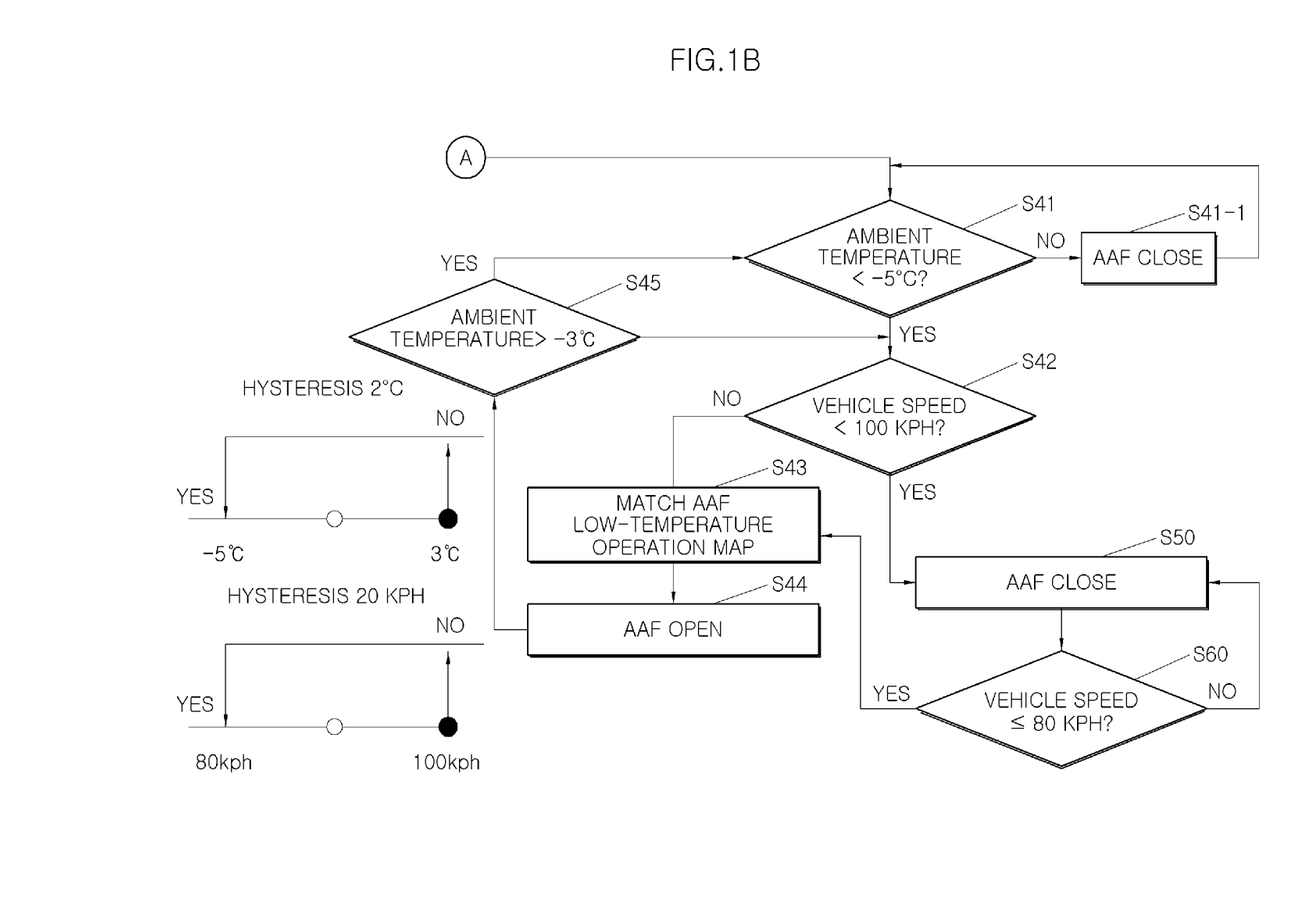

Referring to FIG. 1A and FIG. 1B, according to a method for controlling an active air flap (AAF) based on an aerodynamic force gain, the operation of the AAF is controlled through division of the AAF into an aerodynamic force improvement mode, a heating-related mode, and a cooling-related mode, and by applying an AAF aerodynamic force gain portion based on an ambient temperature below the freezing point and a vehicle speed to the heating-related mode, the heating efficiency of a heat pump according to the operation control of the AAF is increased through high heat-exchanging effect that is caused by the ambient temperature below the freezing point. As a result, the operation control of the AAF that is performed in the heating-related mode causes heating power consumption of the heat pump to be reduced to achieve fuel ratio improvement, and in particular, it makes a great contribution to the real-road fuel ratio improvement of an electric vehicle that adopts the heat pump as a main heating system. Accordingly, the cooling-related mode is called an AAF optimization cooling-related mode.

Figure 2:
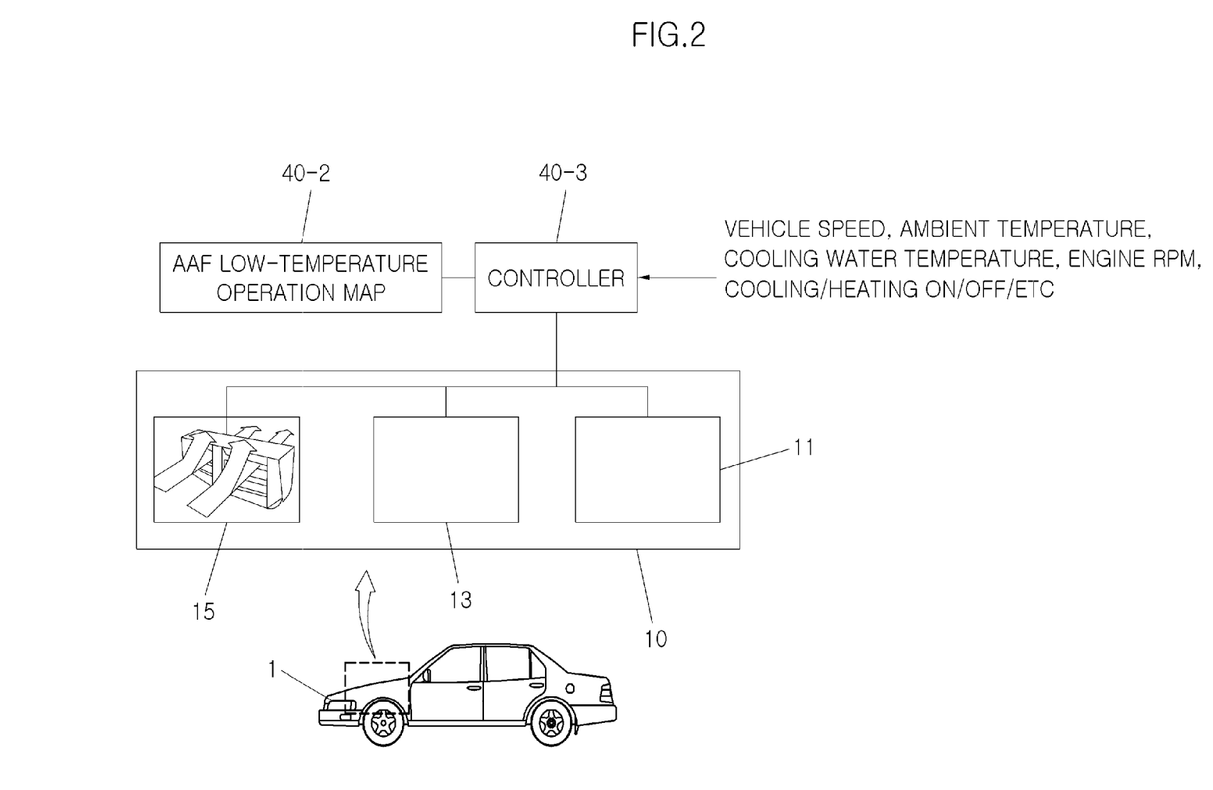
FIG. 2 is a diagram illustrating an example of an echo vehicle in which an active air flap control based on an aerodynamic force gain according to an exemplary embodiment of the present invention is implemented.

Referring to FIG. 2, an eco vehicle 1 includes a heating ventilating and air conditioning system 10 and a controller 20 having an AAF low-temperature operation map 20-1.

Specifically, the heating ventilating and air conditioning system 10 includes a cooling device 11 having a cooling fan together with an air conditioning system, a heating device 13 having a heat pump or a positive temperature coefficient (PTC) heater, and an active air flap (AAF) 15 configured to control traveling wind that is introduced into the engine compartment through adjustment of a flap open step between close and open states. In particular, the AAF 15 implements the aerodynamic force improvement mode that is a basic mode in which the flap open step is controlled to match a vehicle speed, the cooling-related mode in which the flap open step is controlled to match an operation load of the cooling device 11 and the vehicle speed, and the heating-related mode in which the flap open step is controlled to match the operation load of the heating device 13, an ambient temperature, and the vehicle speed.

Specifically, the controller 20 processes information that includes the vehicle speed, an engine revolution per minute, the ambient temperature, a cooling water temperature, and a cooling/heating on/off signal as input data, and is related to an AAF low-temperature operation map 20-1 that matches the AAF aerodynamic force gain portion based on upper/lower temperature threshold values for the ambient temperature and upper/lower speed threshold values for the vehicle speed.

Figure 3A:
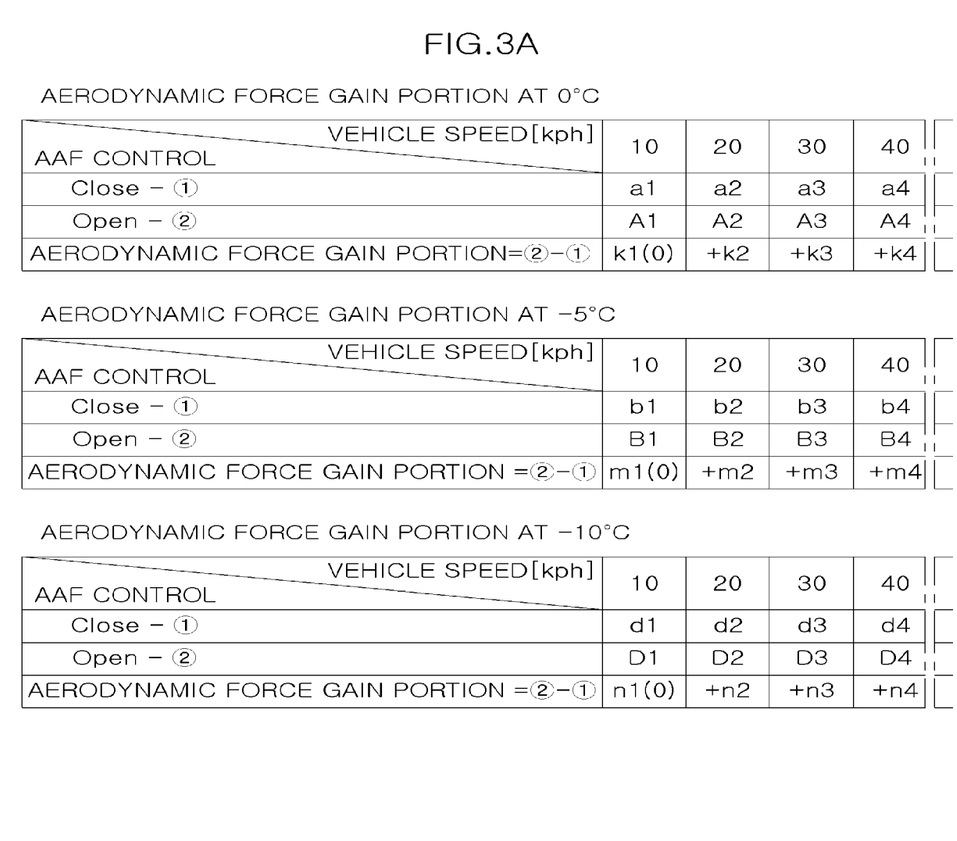
FIG. 3A and FIG. 3B are a diagram illustrating an aerodynamic force gain table by temperatures of the vehicle according to an exemplary embodiment of the present invention.
Figure 3B:
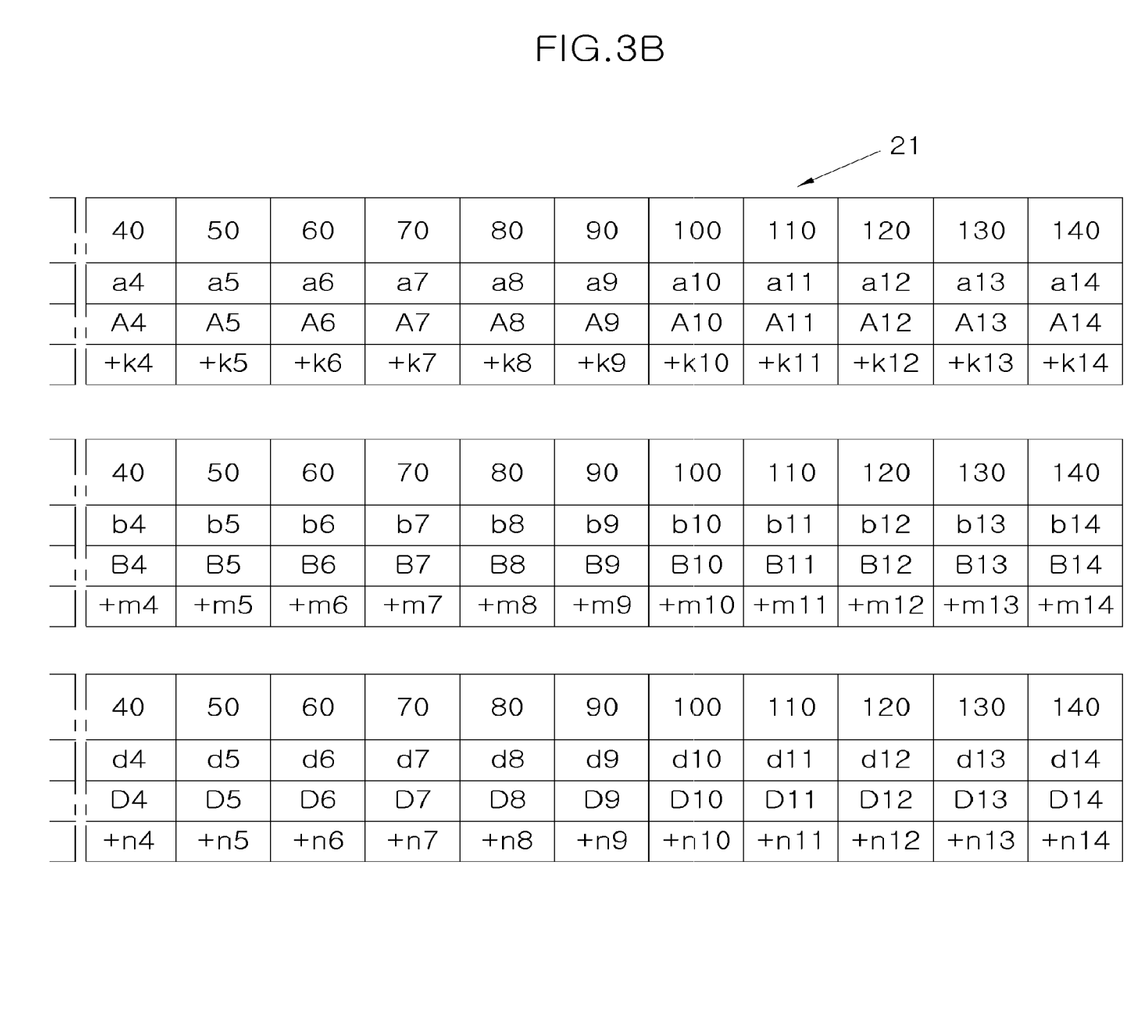

FIGS. 3 A and 3B are to 5 A and 5B are illustrate construction examples of the AAF low-temperature operation map 20-1.

Referring to FIGS. 3 A and 3B, an aerodynamic force gain table 21 by ambient temperatures, which is applied to the AAF low-temperature operation map 20-1, is illustrated. As illustrated, the aerodynamic force gain table 21 by ambient temperatures is exemplarily constructed as a 0° C. aerodynamic force gain table that is acquired through an open/close state of the AAF 15 with respect to a vehicle speed of 10 to 140 kph that is divided in the unit of 10 kph on 0° C. ambient temperature condition, a −5° C. aerodynamic force gain table that is acquired through the open/close state of the AAF 15 with respect to the vehicle speed of 10 to 140 kph that is divided in the unit of 10 kph on −5° C. ambient temperature condition, and a −10° C. aerodynamic force gain table that is acquired through the open/close state of the AAF 15 with respect to the vehicle speed of 10 to 140 kph that is divided in the unit of 10 kph on −10° C. ambient temperature condition.

Here, a1 to a14, b1 to b14, and d1 to d14 are aerodynamic force gain values in the AAF close state, which are integers that are equal to or larger than 1, and A1 to A14, B1 to B14, and D1 to D14 are aerodynamic force gain values in the AAF open state, which are integers that are equal to or larger than 1. Further, k1 to k14, m1 to m14, and n1 to n14 are aerodynamic force gain portions that are obtained by subtracting the aerodynamic force gain values in the AAF open state from the aerodynamic force gain values in the AAF close state, and k1, m1, and n1 are 0 (zero), and k2 to k14, mw to m14, and n2 to n14 are integers that are equal to or larger than 1.

Accordingly, through the aerodynamic force gain table 21 by ambient temperatures, the aerodynamic force gain portions according to the AAF open/close state are determined for the ambient temperatures below the freezing point and the vehicle speeds.

Figure 4A:
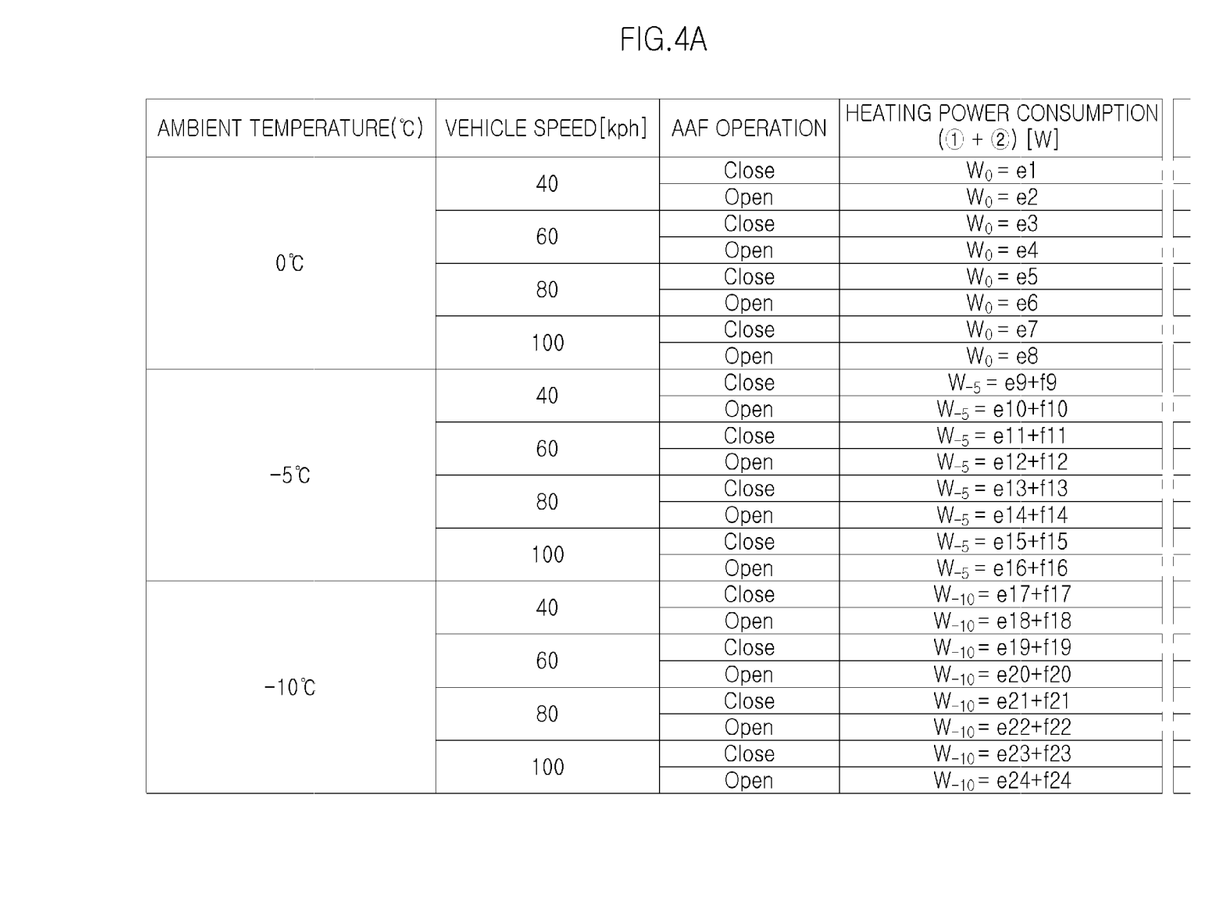
FIG. 4A and FIG. 4B are a diagram illustrating a heating power consumption table of the vehicle according to an exemplary embodiment of the present invention.
Figure 4B:
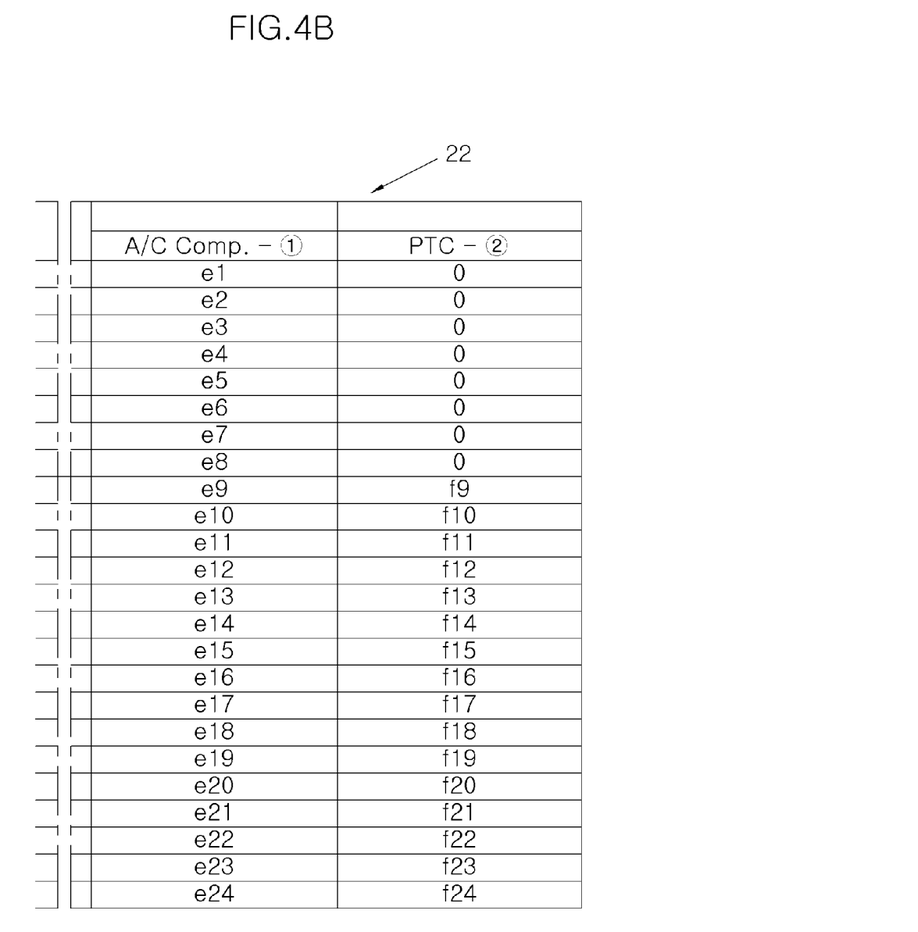

Referring to FIGS. 4 A and 4B, a heating power consumption table 22 that is applied to the AAF low-temperature operation map 20-1 is illustrated. As illustrated, the heating power consumption table 22 is a measurement example of PTC power consumption of an air conditioner compressor of the cooling device 11 and the heating device 13 according to the AAF open/close state during normal-speed traveling for ambient temperatures, and test conditions are air conditioning at 23 degrees (auto), ambient temperature of −10° C. to 0° C., and normal-speed traveling of 40 to 100 kph.

As an example, in the case of the AAF open or close operation control through division into 40 kph, 60 kph, 80 kph, and 100 kph at an ambient temperature of 0° C., a PTC heater is configured not to be operated, and the heating power consumption W is equal to the power consumption e of the air conditioner compressor. In contrast, in a case of the AAF open or close operation control through division into 40 kph, 60 kph, 80 kph, and 100 kph at ambient temperatures of −5° C./−10° C., the PTC heater is operated, and the heating power consumption W is equal to the sum of the power consumption e of the air conditioner compressor and the PTC power consumption f Here, e1 to e24 and f9 to f24 are integers that are equal to or larger than 1.

Figure 5A:
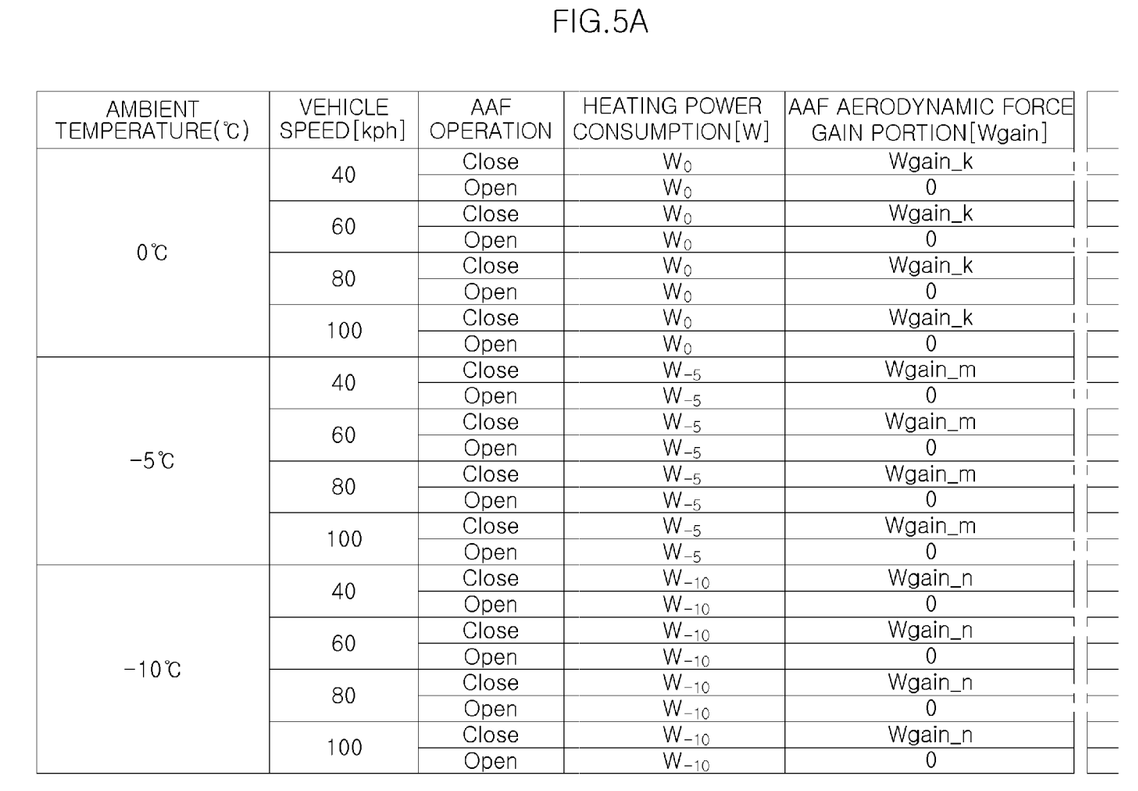
FIG. 5A and FIG. 5B are a diagram illustrating an example of an AAF low-temperature operation map according to an exemplary embodiment of the present invention.
Figure 5B:
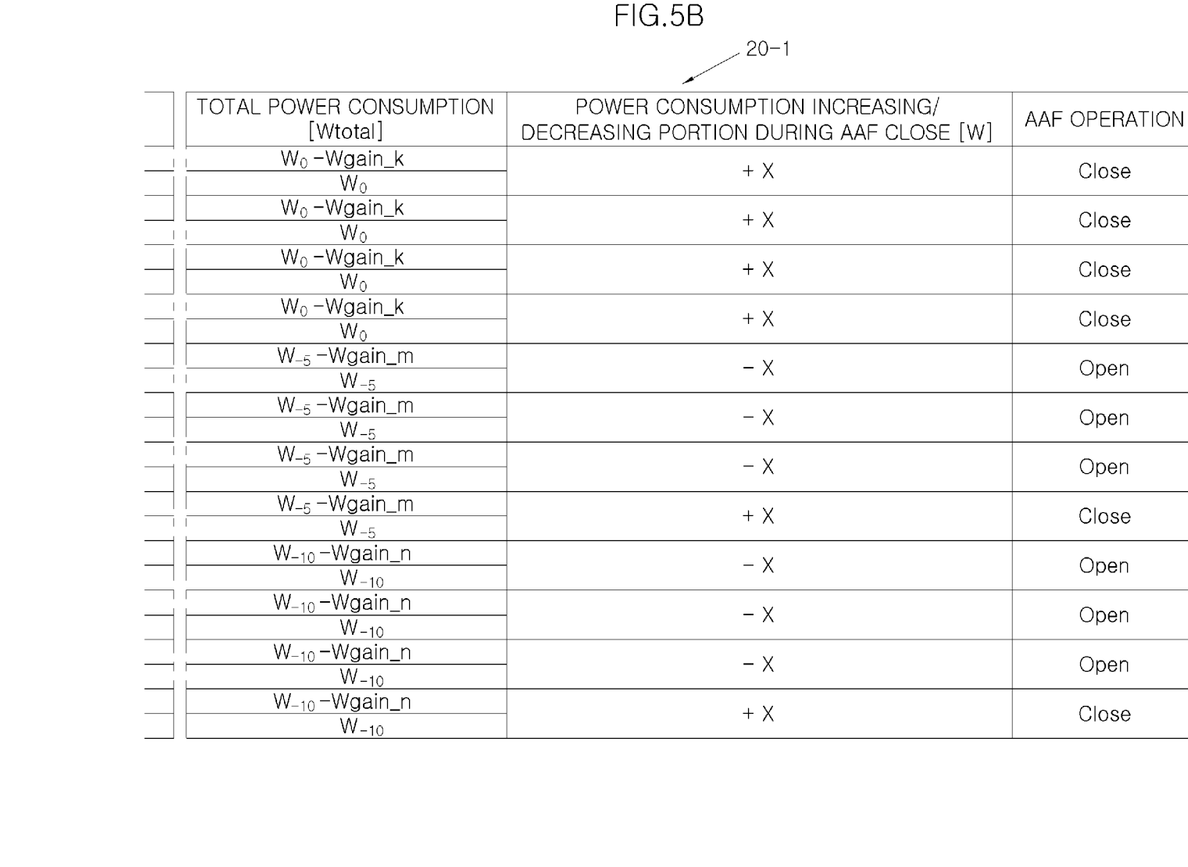

Referring to FIGS. 5 A and 5B, the AAF low-temperature operation map 20-1 is exemplified as an AAF open or close operation control table through matching of the aerodynamic force gain portion that is obtained from the aerodynamic force gain table 21 by ambient temperatures to the heating power consumption that is obtained from the heating power consumption table 22. Here, when a power consumption increasing/decreasing portion is (+), the AAF close control is selected as the AAF optimum control, whereas when the power consumption increasing/decreasing portion is (−), the AAF open control is selected as the AAF optimum control.

As an example, in a case of the AAF open or close operation control through division into 40 kph, 60 kph, 80 kph, and 100 kph under the condition of an ambient temperature of 0° C., the total power consumption $W_{total}$ is obtained, in which an AAF open power consumption increasing/decreasing portion W that is obtained by subtracting an AAF aerodynamic force gain portion $W_{gain\_k}$ from a heating power consumption W0 is 0 (zero), whereas an AAF close power consumption increasing/decreasing portion W is +(positive) X (integer that is equal to or larger than 1). Accordingly, under the condition of the ambient temperature of 0° C., the AAF 15 is continuously controlled to be in the AAF close state regardless of the vehicle speed. In contrast, in a case of the AAF open or close operation control through division into 40 kph, 60 kph, 80 kph, and 100 kph under the condition of ambient temperatures of −5° C./−10° C., the total power consumption $W_{total}$ is obtained, in which the AAF open power consumption increasing/decreasing portion W that is obtained by subtracting the AAF aerodynamic force gain portion $W_{gain\_m}/W_{gain\_n}$ from the heating power consumption (W-5)/(W-10) is 0 (zero), whereas the AAF close power consumption increasing/decreasing portion W is − (negative) X (integer that is equal to or larger than 1) or + (positive) X (integer that is equal to or larger than 1).

Accordingly, under the condition of the ambient temperature of 0° C., the aerodynamic force gain increasing portion becomes + (positive) X regardless of the vehicle speed, and thus the AAF close state of the AAF 15 is more advantageous to the heating mode than the AAF open state. In contrast, under the condition of the ambient temperatures of −5° C./−10° C., the aerodynamic force gain increasing portion becomes − (negative) X at the vehicle speed of 40 kph, 60 kph, and 80 kph, and thus the AAF open state of the AAF 15 is more advantageous to the heating mode than the AAF close state. Accordingly, it can be known that the AAF 15 should be operated in the AAF open state for the AAF optimum control.

Hereinafter, a method for controlling an active air flap based on an aerodynamic force gain as illustrated in FIG. 1A and FIG. 1B will be described in detail with reference to FIGS. 2 and 5A and 5B. It is hereinafter assumed that the control subject is a controller 20 that is related to an AAF low-temperature operation map 20-1, and an object to be controlled is an AAF 15 of a heating ventilating and air conditioning system 10.

At operation S10, information of a traveling vehicle is detected by the controller 20, and at operation S20, introduction into an aerodynamic force improvement mode is determined by the controller 20. At operation S30, introduction into a cooling-related mode is determined by the controller 20. Referring to FIG. 2, the controller 20 receives information that includes a vehicle speed, an ambient temperature, a cooling water temperature, an engine revolution per minute, and a cooling on/off signal as input data. Through this, the controller 20 is configured to determine the introduction into the aerodynamic force improvement mode at operation S20 through continuous monitoring of the vehicle speed, and is configured to determine the introduction into the heating-related mode from the cooling on signal.

At operation S20, the aerodynamic force improvement mode is performed, in which the operation of the AAF 15 is configured to be controlled to match the vehicle speed at operation S20-1 under a predetermined vehicle speed condition, and when the vehicle speed deviates from the AAF operation condition, the AAF control is interrupted at operation S20-2. In the instant case, the vehicle speed that is equal to or higher than the predetermined speed is based on an AAF low-temperature operation map 20-1 and an AAF operation map that is related to the controller 20, and the AAF operation map is a basic constituent element.

At operation S30, the cooling-related mode is performed, in which the operation of the AAF 15 is configured to be controlled to match a cooling load at operation S30-1 under the condition that a cooling device 11 is in an on state. The cooling-related mode is ended when the cooling device 11 is turned off.

At operation S40, introduction into a heating-related mode is determined by the controller 20. Referring to FIG. 2, the controller 20 continuously monitors the ambient temperature and the vehicle speed after determining the introduction into the heating-related mode from a heating on/off signal. As a result, when the ambient temperature and the vehicle speed satisfy specific conditions, the heating-related mode at operation S40 is switched over to an AAF optimization cooling-related mode at operations S41 to S45.

At operation S41, the ambient temperature is determined as an ambient temperature operation control condition of the AAF 15 by the controller 20. For this, the controller 20 applies the following equation.

Ambient temperature determination equation: Detected ambient temperature<Lower-limit ambient temperature setting value Here, the detected ambient temperature is an ambient temperature that is detected outside an echo vehicle 1 when the heating device 13 is operated, and the lower-limit ambient temperature setting value is −5° C. The sign "<" is a sign of inequality that indicates sizes of two values, and it means that the detected ambient temperature is lower than the lower-limit ambient temperature setting value.

As a result, when the detected ambient temperature is higher than the lower-limit ambient temperature setting value of −5° C., the controller 20 controls the AAF 15 in the AAF close state. This is based on the fact that an AAF close power consumption increasing portion W is + (positive) X (integer that is equal to or larger than 1) under the condition of the ambient temperature of 0° C. in the AAF low-temperature operation map 20-1 of FIGS. 5A and 5B. In contrast, when the detected ambient temperature is lower than the lower-limit ambient temperature setting value of −5° C., the controller 20 enters into operation S41-2.

At operation S42, the vehicle speed is determined as a vehicle speed operation control condition of the AAF 15 by the controller 20. For this, the controller 20 applies the following equation.

Vehicle speed determination equation: Detected vehicle speed≥Upper-limit vehicle speed setting value Here, the detected vehicle speed is a vehicle speed that is detected from the echo vehicle 1 when the heating device 13 is operated, and the upper-limit vehicle speed setting value is 100 kph. The sign "≥" is a sign of inequality that indicates sizes of two values, and it means that the detected vehicle speed is equal to or higher than the upper-limit vehicle speed setting value.

As a result, when the detected vehicle speed is higher than the upper-limit vehicle speed setting value of 100 kph, the controller 20 enters into operation S50 to control the AAF 15 in the AAF close state, and then is configured to determine whether to perform feedback to operation S50 to change the vehicle speed as at operation S60 or to switch over to operation S43 to perform vehicle speed operation switchover control of the AAF 15 from the AAF close state to the AAF open state.

To determine the vehicle speed change at operation S60, the controller 20 applies the following equation.

Vehicle speed change determination equation: Redetected vehicle speed≤Lower-limit vehicle speed setting value Here, the redetected vehicle speed is a vehicle speed that is detected from the echo vehicle 1 after the AAF close control at operation S50, and the lower-limit vehicle speed setting value is 80 kph. The sign "≤" is a sign of inequality that indicates sizes of two values, and it means that the redetected vehicle speed is equal to or lower than the lower-limit vehicle speed setting value.

Accordingly, when the vehicle speed is equal to or higher than 80 to 100 kph at an ambient temperature of −5° C., the controller 20 controls the AAF 15 in the AAF close state. This is based on the fact that an AAF close power consumption increasing/decreasing portion W is + (positive) X (integer that is equal to or larger than 1) under the condition of the ambient temperature of 0° C./−5° C./−10° C. in the AAF low-temperature operation map 20-1 of FIG. 5 and the vehicle speed that is equal to or higher than 80 to 100 kph.

In contrast, when the detected vehicle speed is lower than the upper-limit vehicle speed setting value of 100 kph at operation S42, or when the redetected vehicle speed is equal to or lower than the lower-limit vehicle speed setting value of 80 kph at operation S60, the controller 20 switches over to operation S43 to continue the AAF optimization cooling-related mode.

At operation S43, the AAF optimization cooling-related mode is performed by the controller 20. Referring to FIGS. 5 A and 5B, the controller 20 matches the detected ambient temperature and the detected vehicle speed or redetected vehicle speed to the AAF low-temperature operation map 20-1, and outputs the AAF open signal of the AAF 15 according to a result of matching.

As an example, the AAF open signal is output in a case of 40 kph, 60 kph, or 80 kph at the ambient temperature of −5° C., or in a case of 40 kph, 60 kph, or 80 kph at the ambient temperature of −10° C.

At operation S44, the AFF 15 is configured to be controlled to operate in the AFF open state by the output of the controller 20, and at operation S45, the ambient temperature is redetected by the controller 20, and it is determined whether to perform the ambient temperature operation switchover control of the AAF 15 from the AAF open state to the AAF close state. For this, the controller 20 applies the following equation.

Ambient temperature redetermination equation: Redetected ambient temperature>Upper-limit ambient temperature setting value Here, the redetected ambient temperature is an ambient temperature that is detected outside the echo vehicle 1 after the AAF open control at operation S44, and the upper-limit ambient temperature setting value is −3° C. The sign ">" is a sign of inequality that indicates sizes of two values, and it means that the redetected ambient temperature is higher than the upper-limit ambient temperature setting value.

As a result, when the redetected ambient temperature is lower than the upper-limit ambient temperature setting value of −3° C., the controller 20 performs feedback to operation S42 to repeat the AAF open/close procedure according to the vehicle speed.

However, when the redetected ambient temperature is higher than the upper-limit ambient temperature setting value of −3° C., the controller 20 performs feedback to operation S41. As a result, when the redetected ambient temperature is lower than the lower-limit ambient temperature setting value of −5° C., the controller 20 enters into operation S42 to repeat the AAF open/close procedure according to the vehicle speed. In contrast, when the redetected ambient temperature is higher than the lower-limit ambient temperature setting value of −5° C., the controller 20 switches over to operation S41-1 to control the AAF 15 in the AAF close state.

The AAF optimization cooling-related mode through operation S40 is ended when the heating device 13 is turned off.

As described above, according to the echo vehicle in which the active air flap control based on the aerodynamic force gain according to the exemplary embodiment of the present invention is implemented, the AAF 15 is divided into the aerodynamic force improvement mode in which the AAF open or close operation control is performed to match the vehicle speed so as to improve the aerodynamic force, the heating-related mode in which the AAF open or close operation control is performed to match the cooling load of the cooling device 11, and the AAF optimization cooling-related mode in which the AAF open or close operation control is performed to match the detected ambient temperature and the vehicle speed to heighten the heat exchanging effect between the heat pump and the atmosphere. Accordingly, the operation of the AAF 15 causes the reduction of the heating power consumption of the heat pump to achieve the fuel ratio improvement. As a result, the real-road fuel ratio of the electric vehicle that adopts the heat pump as the main heating system is greatly improved.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an active air flap (AAF) based on an aerodynamic force gain, the method including:
   detecting an ambient temperature and a vehicle speed;
   detecting an operation state of the AAF;
   determining whether the ambient temperature coincides with an ambient-temperature operation control condition of the AAF when detecting an operation of a heating device;
   determining whether the vehicle speed coincides with a vehicle-speed operation control condition of the AAF when the ambient temperature coincides with the ambient-temperature operation control condition;
   controlling the AAF to operate in an AAF open state through matching of the ambient temperature to the vehicle speed when the vehicle speed coincides with the vehicle-speed operation control condition; and
   controlling an ambient-temperature operation of the AAF to be switched over from the AAF open state to an AAF close state according to the ambient temperature,
   wherein an operation state of the AAF corresponds to an aerodynamic force improvement mode in which the AAF is configured to be controlled to operate in the AAF open state or the AAF close state to improve an aerodynamic force of a vehicle, or a heating-related mode in which the AAF is configured to be controlled to operate in the AAF open state or the AAF dose state according to an operation of a cooling device, wherein the heating-related mode is selected according to a power consumption increasing/decreasing portion which is obtained by subtracting an aerodynamic force gain portion from a heating power consumption, and wherein the heating power consumption is calculated by dividing an ambient temperature for the vehicle speed of 40 to 100 kph in a condition of the ambient temperature of 0° C., the ambient temperature of −5° C. and the ambient temperature of −10° C. and the aerodynamic force gain portion is calculated by dividing the ambient temperature for the vehicle speed of 10 to 140 kph by the condition of the ambient temperature of 0° C. the ambient temperature of −5° C. and the ambient temperature of −10° C.

2. The method according to claim 1, wherein determination of the ambient temperature is performed by determining the ambient temperature as the detected ambient temperature and determining whether the detected ambient temperature is lower than a lower-limit ambient temperature setting value.

3. The method according to claim 2, wherein the lower-limit ambient temperature setting value is −5° C.

4. The method according to claim 1, further including controlling the AAF to operate in the AAF close state when the ambient temperature does not coincide with the ambient-temperature operation control condition.

5. The method according to claim 1, wherein determination of the vehicle speed is performed by determining the vehicle speed as the detected vehicle speed and determining whether the detected vehicle speed is lower than an upper-limit vehicle speed setting value.

6. The method according to claim 5, wherein the upper-limit vehicle speed setting value is 100 kph.

7. The method according to claim 1, further including controlling the AAF to operate in the AAF close state when the vehicle speed does not coincide with the vehicle-speed operation control condition.

8. The method according to claim 7, further including controlling a speed operation switchover of the AAF to be switched over from the AAF close state to the AAF open state through matching of the ambient temperature to a redetected vehicle speed when the redetected vehicle speed is configured to be reduced in the AAF close state.

9. The method according to claim 8, wherein the speed operation switchover is configured to be controlled through determination of whether the redetected vehicle speed is lower than a lower-limit vehicle speed setting value.

10. The method according to claim 9, wherein the lower-limit vehicle speed setting value is approximately 80 kph.

11. The method according to claim 1, wherein an ambient-temperature operation switchover is performed so that the AAF is switched over from the AAF open state to the AAF close state in a case where a redetected ambient temperature is higher than an upper-limit ambient temperature setting value and higher than an lower-limit ambient temperature setting value.

12. The method according to claim 11, wherein the upper-limit ambient temperature setting value is −3° C.

13. The vehicle comprising:
a controller configured to execute the method of claim 1; and
a heating ventilating and air conditioning system including the cooling device and the heating device together with the AAF.

14. The vehicle according to claim 3, wherein control of open or close operation of the AAF is performed by the controller that is related to an AAF low-temperature operation map.

15. The vehicle according to claim 14, wherein the AAF low-temperature operation map is divided into open and close states of the AAF through matching of an aerodynamic force gain table to a heating-power consumption table, and
the aerodynamic force gain portion according to an open/close state of the AAF at the ambient temperature below a freezing point and at the vehicle speed of 10 to 140 kph is constructed in the aerodynamic force gain table, and a sum of a cooling device power consumption and a heating device power consumption according to the open/close state of the AAF when the cooling device and the heating device are operated at the ambient temperature below the freezing point and at the vehicle speed of 40 to 100 kph is constructed in the heating power consumption table.

* * * * *